United States Patent [19]

Kurata et al.

[11] Patent Number: 5,379,292
[45] Date of Patent: Jan. 3, 1995

[54] APPARATUS HAVING PRIORITY ORDER STORAGES FOR RECOVERY FROM FAILURE OF MULTIPLEX DATA TRANSMISSION

[75] Inventors: Yasuhiko Kurata, Higashihiroshima; Osamu Michihira, Hiroshima, both of Japan

[73] Assignees: Naldec Corporation; Mazda Motor Corporation, both of Hiroshima, Japan

[21] Appl. No.: 909,662

[22] Filed: Jul. 7, 1992

[30] Foreign Application Priority Data

Jul. 8, 1991 [JP] Japan .................................. 3-167115
Sep. 30, 1991 [JP] Japan .................................. 3-278383

[51] Int. Cl.$^6$ .............................................. H04J 3/02
[52] U.S. Cl. ................................... 370/85.6; 370/85.13; 370/85.14
[58] Field of Search ................. 370/85.6, 85.13, 85.14, 370/16.1, 28; 340/825.5, 825.51; 371/10.1, 10.2, 13

[56] References Cited

U.S. PATENT DOCUMENTS

| | | | |
|---|---|---|---|
| 4,510,599 | 4/1985 | Ulug | 370/85.6 |
| 4,627,052 | 12/1986 | Hoare et al. | 370/88 |
| 4,715,031 | 12/1987 | Crawford et al. | 370/85.6 |
| 4,942,571 | 7/1990 | Moller et al. | 370/85 |
| 4,951,281 | 8/1990 | Muto et al. | 370/95.2 |
| 5,018,133 | 5/1991 | Tsukakoshi et al. | 370/16 |
| 5,043,981 | 8/1991 | Firoozmand et al. | 370/85.6 |
| 5,050,165 | 9/1991 | Yoshioka et al. | 370/85.13 |

FOREIGN PATENT DOCUMENTS

| | | |
|---|---|---|
| 0399491A2 | 11/1990 | European Pat. Off. . |
| 3904403A1 | 8/1989 | Germany . |
| 64-36541 | 2/1964 | Japan . |
| 62-4658 | 1/1987 | Japan . |

*Primary Examiner*—Douglas W. Olms
*Assistant Examiner*—Shick Hom
*Attorney, Agent, or Firm*—Staas & Halsey

[57] ABSTRACT

In a multiplex transmission apparatus, multiplex transmission paths to each of which a plurality of communication nodes are connected through a gateway node. When data transfer between the multiplex transmission paths is disabled, data are temporarily saved in a stack according to priority order of data, and when the saved data are transmitted, the data are transmitted on the basis of the priority order and the storage order of the data, thereby preventing omission of transfer data.

6 Claims, 4 Drawing Sheets

APPARATUS HAVING PRIORITY ORDER STORAGES FOR RECOVERY FROM FAILURE OF MULTIPLEX DATA TRANSMISSION

BACKGROUND OF THE INVENTION

The present invention relates to a multiplex transmission apparatus comprising a plurality of communication networks, and a gateway node, interposed between the plurality of communication networks, for transmitting data.

According to remarkable development of electronics for vehicles, a large number of electrical components such as switches, sensors, actuators, and the like tend to be mounted therein, thus posing a serious problem associated with enlarged and complicated wiring harnesses for connecting the electrical components. In order to solve this problem, a multiplex transmission system in which a transmission path is commonly used by a large number of electrical components is adopted. In this system, communication nodes for the various electrical components, and communication nodes for control systems of, e.g., engine control (EGI), four-wheel steering control (4WS), anti-lock brake control (ABS), and the like are connected to a multiplex transmission path to constitute a time-divisional multiplex transmission network.

In addition, a multiplex transmission apparatus is known. In this apparatus, a large number of communication nodes are classified into a first group consisting of communication nodes for control systems such as EGI, which require high-speed transmission, and a second group consisting of communication nodes for, e.g., electrical components such as switches, which do not require relatively high-speed transmission, and communication nodes for, e.g., an audio system, an air conditioner, and the like, which are not directly related to travel performance. The communication nodes in the first group are connected to a high-speed multiplex transmission path to constitute a first network, and the communication nodes in the second group are connected to a low-speed multiplex transmission path to constitute a second network. A gateway node is arranged between the high- and low-speed multiplex transmission paths, and performs data transfer between the communication nodes in the first and second groups, thereby constituting two multiplex transmission network systems, which can perform intercommunications.

A frame as a unit of a transmission signal of each node has a data field, an ID code field indicating a transmission source, and a priority code field indicating the priority order of transmission. The ID code designates a reception destination of the frame, and each node identifies based on the ID code whether or not a frame on the multiplex transmission path, to which the node is connected, is addressed to the node. The gateway node checks based on the ID codes whether or not data transfer is required. The priority code aims at preventing collision of frames on the multiplex transmission path of each network. If a high-priority node is executing transmission, transmission of a low-priority node is not executed and waits until transmission of the high-priority node is completed.

The gateway node always monitors the ID codes of frames on the first and second networks. When a frame having an ID code requiring data transfer is transmitted onto the multiplex transmission path of either network, the gateway node fetches the frame, and transmits data onto a reception-side network at an adjusted transmission speed after the multiplex transmission path of the reception-side network is ready. When the gateway node is set in a transmission standby state since the multiplex transmission path of the reception-side network is busy due to communications among the communication nodes in the network, and when the gateway node receives additional transfer data, the standby transfer data is lost, and a function to be realized based on the lost data cannot be realized.

However, in the multiplex transmission path comprising the gateway node, a data stack has a one-dimensional structure based on time, and reads out and transmits data in a storage order. Therefore, when low-priority data is stored before high-priority data, the low-priority data is read out and transmitted, and then, the high-priority data is transmitted, thus delaying transmission of the high-priority data.

SUMMARY OF THE INVENTION

It is an object of the present invention to provide a multiplex transmission apparatus which can prevent omission of transfer data between multiplex transmission networks, and can smoothly perform communications between the networks.

It is another object of the present invention to provide a multiplex transmission apparatus, which stores data on the basis of their priority levels, and gives priority to the priority levels over the storage time order of stored data, so that high-priority data can be smoothly transmitted without being disturbed by low-priority data.

In order to achieve the above objects, according to the present invention, there is provided a multiplex transmission apparatus comprising first and second multiplex transmission paths to each of which a plurality of communication nodes are connected, and a gateway node, interposed between the first and second multiplex transmission paths, for controlling data transfer therebetween, comprising means, in the gateway node, for detecting a data transfer, disabling or failure error between the first and second multiplex transmission paths, storage means for, when the error is detected, temporarily storing transfer data on the basis of a priority order of the transfer data, and means for, when the error is recovered, transferring the stored data according to the priority order.

Preferably, the storage means stores data having the same priority order in an input time order to the storage means, and when the error is recovered, data having different priority order levels are transferred according to the priority order, and data having the same priority order are transferred in a storage time order.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

Figure 1:
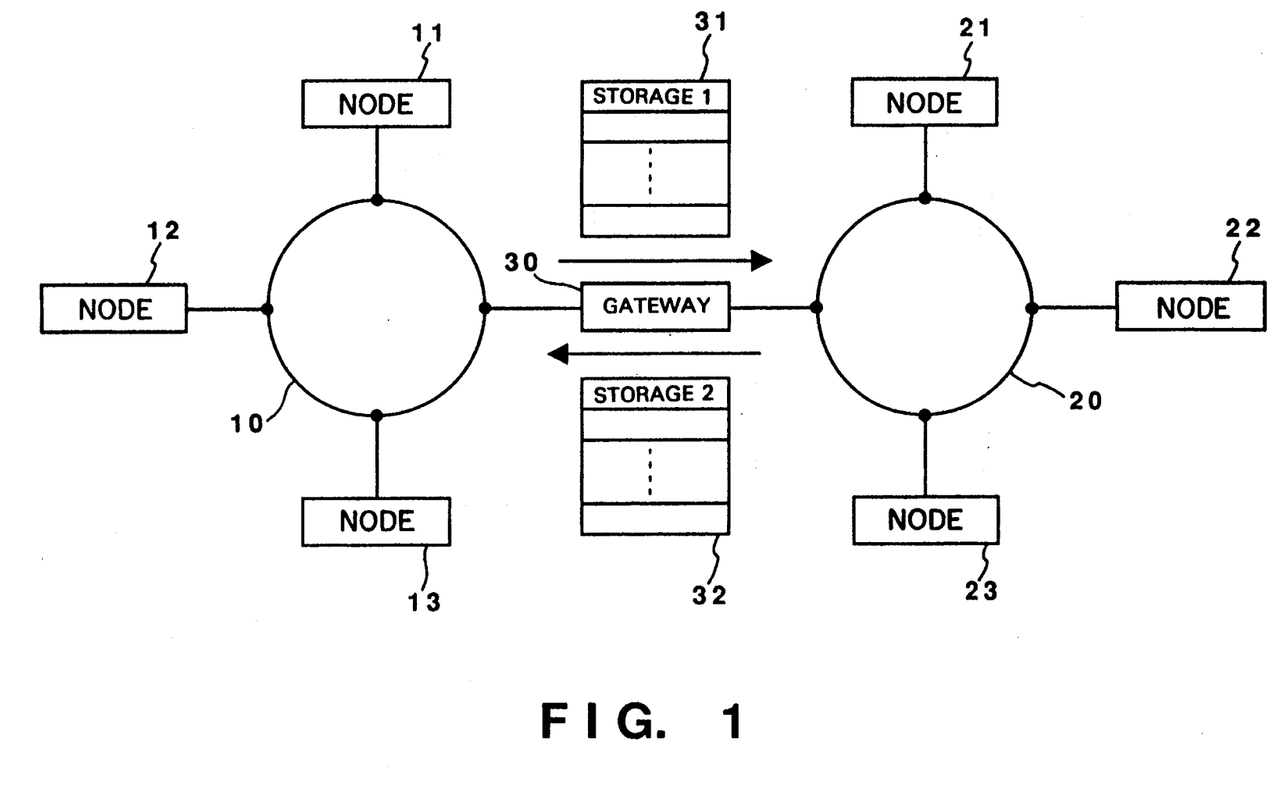
FIG. 1 is a block diagram showing an embodiment of a multiplex transmission apparatus according to the present invention.

In FIG. 1, communication nodes 11, 12, and 13 (e.g., communication nodes for control systems such as EGI, 4WS, ABS, and the like requiring high-speed transmission) in a first group are connected to a first multiplex transmission path 10 formed in a loop pattern using twisted pair wires, thus constituting a first multiplex transmission network (to be referred to as a network 1 hereinafter) as a whole. Similarly, communication nodes 21, 22, and 23 (communication nodes for electrical components such as switches and devices such as an air conditioner, which do not relatively require high-speed transmission) in a second group are connected to a second multiplex transmission network 20 formed in a loop pattern using twisted pair wires, thereby constituting a second multiplex transmission network (to be referred to as a network 2 hereinafter).

A gateway node 30 is arranged between the first and second multiplex transmission paths 10 and 20, and performs data transfer between the communication nodes 11, 12, and 13 in the first group, and the communication nodes 21, 22, and 23 in the second group. The gateway node 30 comprises a first data stack (first storage means) 31 for saving and storing transfer data from the first multiplex transmission path 10 to the second multiplex transmission path 20, and a second data stack (second storage means) 32 for saving and storing transfer data from the second multiplex transmission path 20 to the first multiplex transmission path 10.

Figure 2:
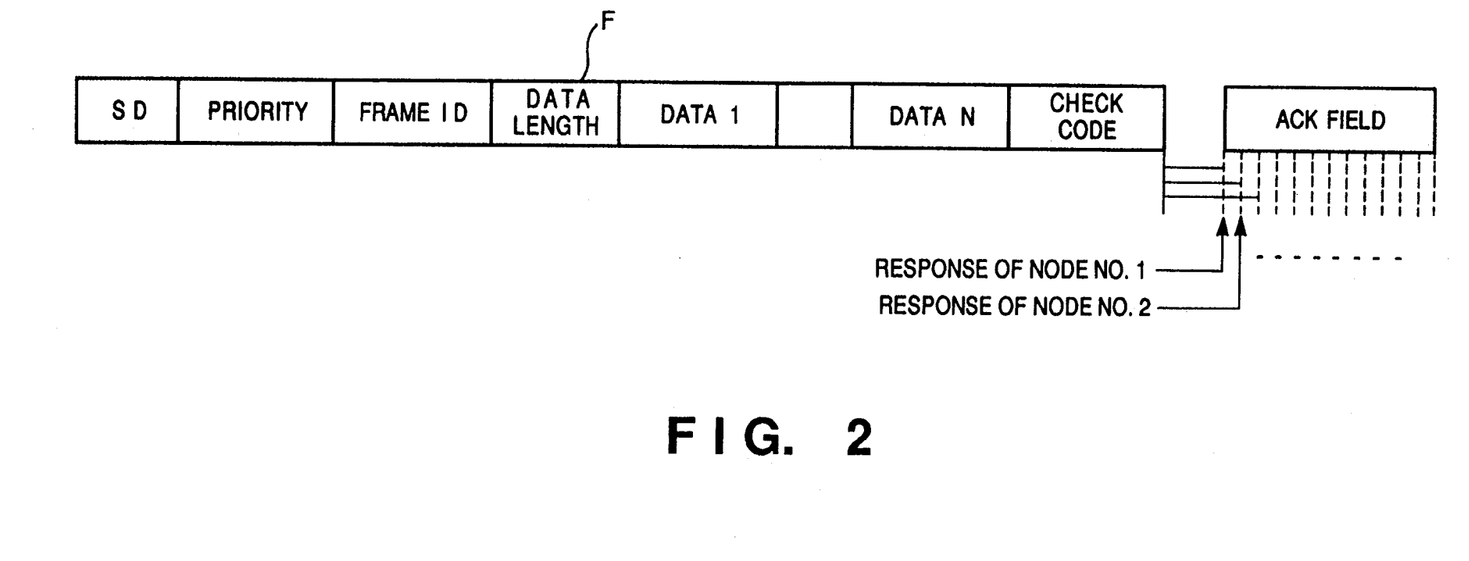
FIG. 2 is a diagram illustrating the format of a frame used in the embodiment.

In the multiplex transmission apparatus of the present embodiment, information is transmitted every frame F, which has the configuration shown in FIG. 2.

The frame F has an SD (start delimiter) code, a priority code, a frame ID code, a data length, data 1 through N, and a check code.

The "SD" code is a specific code representing the start of the frame F. When a communication node receives the SD code, it recognizes the start of the frame F. The "priority" code indicates order of priority, which designates which signal is to be given priority for processing when a plurality of communication nodes transmit data simultaneously and the signals collide with each other. In this embodiment, priority is such that the lower the bit value, the higher the order of priority. The reason is that the logic level is achieved by a wired-OR on transmission path. If signals are transmitted by a plurality of nodes at the same time, the "priority" codes of nodes having high orders of priority remain on transmission path. Therefore, nodes having low orders of priority detect collision since the priority codes transmitted by these nodes change to other codes. These nodes of low priority delay retransmission of their own failed frames, as a result of which retransmission from nodes of high priority takes precedence.

The "frame ID" code identifies the destination of the particular frame and a node for the origin of a transmission is attached.

As for "data length", a number of items of data are written following this. If these items of data are N in number, then N will be transmitted as the data length.

At a communication node which has received this frame, only the content of this data length is read. The field which immediately follows this data is a CRC check code (error detection code). End of the frame can be determined by acknowledging this code.

As mentioned above, a frame as a unit of a transmission signal in each of the communication nodes 11, 12, 13, 21, 22, and 23 of the networks 1 and 2, and the gateway node 30 comprises a data field, an ID code field indicating a transmission destination, and a priority code field indicating the priority order of transmission. Each of the communication nodes 11, 12, and 13 of the network 1 identifies based on the ID code of a frame on the first multiplex transmission path 10 whether or not the frame is addressed to itself. Each of the communication nodes 21, 22, and 23 of the network 2 also identifies based on the ID code of a frame on the second multiplex transmission path 20, whether or not the frame is addressed to itself. Thus, each node receives a frame addressed thereto.

The gateway node 30 stores all the ID codes of frames to be data-transferred from the network 1 to the network 2. The node 30 checks based on the ID code of a frame on the first multiplex transmission path 10 whether or not data transfer from the network 1 to the network 2 is required, and transfers a frame requiring transfer from the first multiplex transmission path 10 to the second multiplex transmission path 20. At the same time, the node 30 also stores all the ID codes of frames to be data-transferred from the network 2 to the network 1. The node 30 checks based on the ID code of a frame on the second multiplex transmission path 20 whether or not data transfer from the network 2 to the network 1 is required, and transfers a frame requiring transfer from the second multiplex transmission network 20 to the first multiplex transmission network 10.

Note that the priority code aims at preventing collision of frames on the first and second multiplex transmission paths 10 and 20 of the networks 1 and 2. Transmission of a low-priority node is executed after transmission of a high-priority node is completed.

Figure 3:
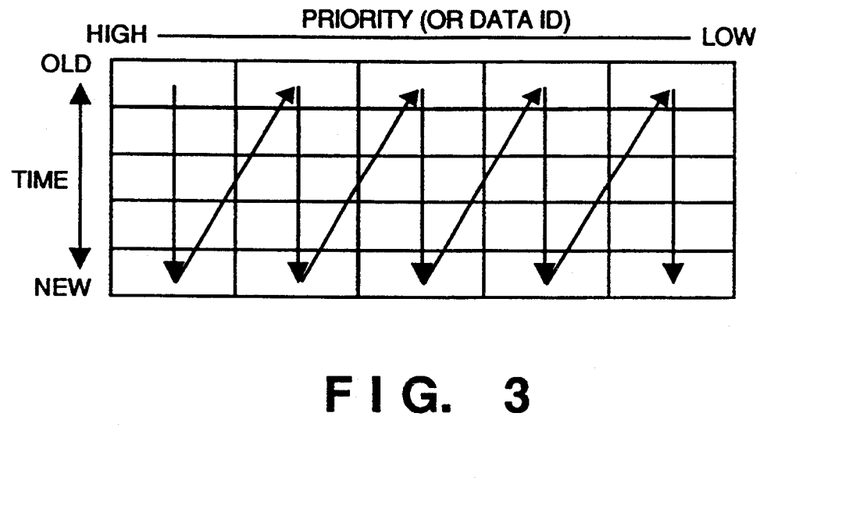
FIG. 3 is an explanatory view showing the architecture of a storage means (data stack)

The first and second data stacks 31 and 32 employ a FIFO (First In First Out) system, as shown in FIG. 3, so that a plurality of stages five stages in FIG. 3) of the priority order are set, and data stored earlier can be preferentially read out in correspondence with each stage. When a frame is to be transferred from one network to the other network, and when the frame cannot be transferred since, for example, the transfer-destination network is busy due to communications among the communication nodes 11, 12, and 13, or 21, 22, and 23 in the network, data are sequentially saved in the corresponding stack according to the priority level indicated by the priority code of the frame.

Figure 4:
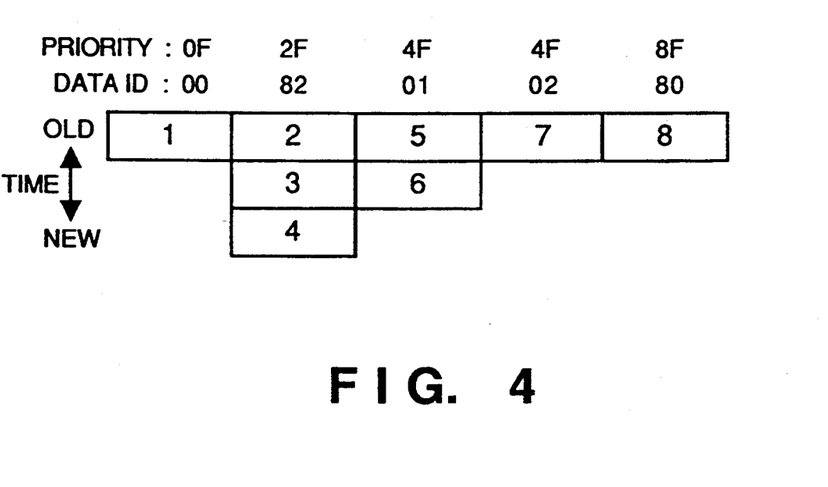
FIG. 4 is an explanatory view showing an example of the storage means (data stack)

When frames of data to be transferred, which have the same priority level and different data IDs (i.e., ID codes) are to be saved, FIFO stacks corresponding to the same priority level are prepared in units of ID codes, and the priority order is determined based on the ID codes at this time (e.g., data having a priority level 4F and ID codes 01 and 02 in FIG. 4).

When the transfer-destination network becomes ready to receive, data having an older write order is preferentially read out from a stack having a higher priority level, and the readout data is transferred to the transfer-destination network. An arrow in FIG. 3 indicates the order of reading out data from the data stack, and FIG. 4 shows an example of the actual order when data are re-transferred. In FIG. 4, numerals in frames indicate the re-transfer order.

The operation of the multiplex transmission apparatus according to this embodiment will be described below with reference to the flow chart shown in FIG. 5. If it is determined in step S1 in FIG. 5 that the gateway node 30 received data from the network 1, it is checked based on an ID code in step S2 if the data is required to be transferred to the network 2. If NO in step S2, the flow returns to step S1; otherwise, the condition of the reception-side network 2 is checked to discriminate whether of not the network 2 can accept transferred data (step S3). If YES in step S3, data is transferred to the network 2 (step S4).

When the network 2 cannot accept the transferred data since, for example, the multiplex transmission network 20 of the reception-side network 2 is busy due to communications among the communication nodes 21, 22, and 23 in the network 2, the data to be transmitted is saved in the corresponding stack of the first data stack 31 according to the priority level of the data to be transferred (according to the ID code when the data having the same priority level and a different ID code is present), and the node 30 enters a transmission standby state (step S11). It is then checked if the first data stack 31 overflows (step S12). If NO in step S12, the flow returns to step S1. When the flow returns to step S1, if new transfer data is detected, the above-mentioned flow is repeated to save the new transfer data in the corresponding stack according to the priority level of the transfer data. Even when the gateway node 30 in the transmission standby state receives another transfer data, the transfer data will never be lost.

When the flow returns to step S1, if new transfer data is not received from the network 1, it is checked if the first data stack 31 stores saved data (step S21). If YES in step S21, it is confirmed that transmission to the network 2 is possible (step S22). Of the transfer data stored in the first data stack 31, data having a higher priority level is preferentially read out from the stack having a higher priority level. Of data having the same priority level, data written earlier is preferentially read out. The readout data is transmitted to the network 2, and the flow then returns to step S1. When there is no saved data in the first data stack 31 upon repetition of this operation, since NO is determined in step S21, the flow returns to step S1, and the node 30 enters a reception standby state of transfer data from the network 1. When transmission to the network 2 is impossible (NO in step S22), the flow also returns to step S1 to set the reception standby state.

The first data stack 31 normally has the number of stages or a storage capacity according to the generation frequency of data transfer by the gateway node 30. Thus, when an error occurs in neither the transmission-side network 1 nor the reception-side network 2, the first data stack 31 will not overflow. However, when an error occurs in the transmission-side network 1 or the reception-side network 2, e.g., when the communication node 11 of the transmission-side network 1 malfunctions and generates a large amount of insignificant transfer data in a short time period, or when a hard error or failure (e.g., disconnection of the twisted pair wires, short-circuit to a ground terminal or a power supply, or the like) occurs in the multiplex transmission path 20 of the reception-side network 2, the first data stack 31 may overflows, and transfer data may be undesirably omitted. In this manner, when the first data stack 31 overflows, overflow information for informing that the first data stack 31 over, flows is transmitted to the two networks 1 and 2 (step S31). Multiplex transmission control is interrupted, and the control enters a standby state (step S32). At the same time, the communication nodes 11, 12, 13, 21, 22, and 23 of the two networks 1 and 2 detect generation of the error and omission of transfer data on the basis of the overflow information transmitted from the gateway node 30, and start a backup operation. For example, only when a normal state is recovered when an ignition switch is temporarily turned off, and is then turned on, the multiplex transmission control operation can be restarted. More specifically, after it is detected that a predetermined restoration condition is established (step S33), the flow returns to step S1.

Figure 5:
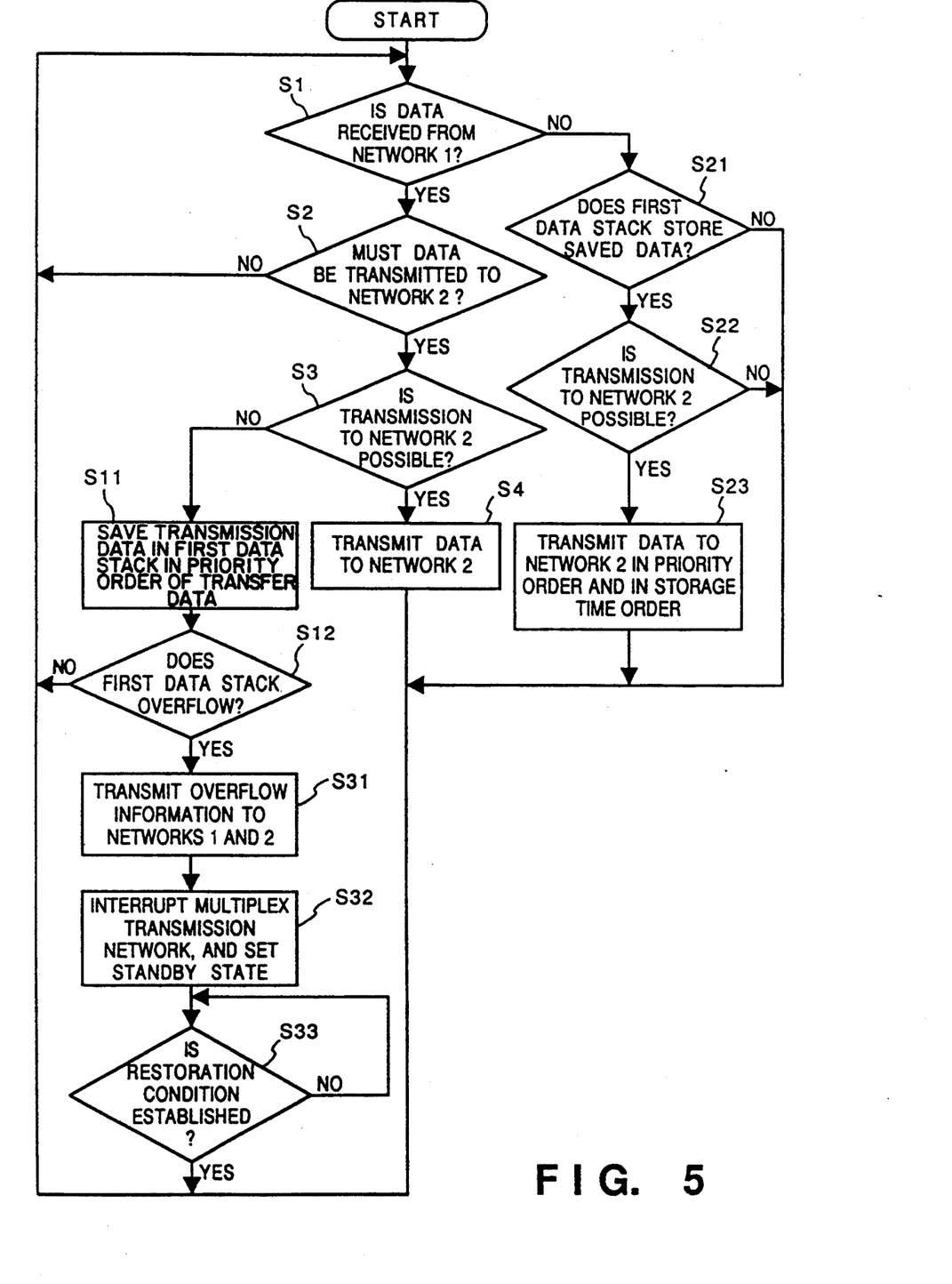
FIG. 5 is a flow chart showing an operation of a gateway node according to the present invention.

Note that the operation of the gateway node 30 in data transfer in a direction from the network 2 to the network 1 is substantially the same as that shown in the flow chart of FIG. 5, except that the second data stack 32 is used for saving transfer data, and a detailed description thereof will be omitted.

The overflow information generated by the gateway node 30 is transmitted to the first and second multiplex transmission paths 10 and 20 of the networks 1 and 2 when one of the first and second data stacks 31 and 32 overflows.

When the Generation frequency of data transfer varies depending on the data transfer direction, the first and second data stacks 31 and 32 may have different numbers of priority stages (storage capacities). For example, when data transfer from the network 2 to the network 1 is unnecessary, the second data stack 32 may be omitted.

In the above embodiment, the gateway node 30 stores all the ID codes of frames to be data-transferred, and checks the necessity of data transfer by comparing the stored ID codes and the ID codes of frames on the first and second multiplex transmission paths 10 and 20. Alternatively, a frame may have a field for indicating whether or not transfer is required, and the gateway node 30 may check the necessity of data transfer on the basis of the content of the field.

In this manner, data are stored on the basis of the priority level order, and the stored data are read out and transmitted in the priority level order. Thus, high-priority data can be smoothly transmitted without being disturbed by low-priority data.

When data are stored on the basis of the priority level order, if data have the same priority level, they are stored on the basis of a storage time order. Upon data transmission, the priority level order has priority over the time order, so that high-priority data can be smoothly transmitted without being disturbed by low-priority data.

As many apparently widely different embodiments of the present invention can be made without departing from the spirit and scope thereof, it is to be understood that the invention is not limited to the specific embodiments thereof except as defined in the appended claims.

What is claimed is:

1. A multiplex transmission apparatus, comprising:
a first multiplex transmission path having a first transmission rate and a second multiplex transmission path having a second transmission rate lower than the first transmission rate and to each of which a plurality of communication nodes are connected;

a gateway node, interposed between said first and second multiplex transmission paths, for controlling data transfer therebetween;

means, in said gateway node, for detecting a failure in a data transfer between said first and second multiplex transmission paths;

storage means, in said gateway node, for, when said failure is detected, temporarily storing transfer data on the basis of a priority order of the transfer data, said storage means including, a first storage means arranged in correspondence with data transfer from the first multiplex transmission path to the second multiplex transmission path; and, a second storage means arranged in correspondence with data transfer from the second multiplex transmission path to the first multiplex transmission path; and transfer means for, when said failure is recovered, transferring said stored transfer data according to said priority order.

2. The apparatus according to claim 1, wherein said storage means stores data having the same priority order according to an order of predetermined data identifiers.

3. The apparatus according to claim 6, wherein said storage means further comprises first storage means and second storage means, said first storage means is arranged in correspondence with data transfer from the first multiplex transmission path to the second multiplex transmission path, and said second storage means is arranged in correspondence with data transfer from the second multiplex transmission path to the first multiplex transmission path.

4. The apparatus according to claim 3, wherein said first and second storage means have priority orders associated with transfer data, which orders have different numbers of stages according to generation frequencies of data transfer.

5. The apparatus according to claim 1, wherein said storage means further comprises overflow information generation means, and when said storage means overflows, said overflow information generation means informs said first and second multiplex transmission paths of the fact that said storage means overflows.

6. A multiplex transmission apparatus, comprising:

a first multiplex transmission path having a first transmission rate and a second multiplex transmission path having a second transmission rate lower than the first transmission rate and to each of which a plurality of communication nodes are connected;

a gateway node, interposed between said first and second multiplex transmission paths, for controlling data transfer therebetween;

means, in said gateway node, for detecting a failure in a data transfer between said first and second multiplex transmission paths;

storage means, in said gateway node, for, when said failure is detected, temporarily storing transfer data on the basis of a priority order of the transfer data; and transfer means for, when said failure is recovered, transferring said stored transfer data according to said priority order, wherein said storage mean stores data having a same priority order in order of arrival into said storage means, and when said failure is recovered, said transfer means transfers dam having different priority order levels in order from higher to lower priority order, said transfer means transfers data having the same priority order in order of storage into said storage means.

* * * * *

UNITED STATES PATENT AND TRADEMARK OFFICE
CERTIFICATE OF CORRECTION

PATENT NO. : 5,379,292      Page 1 of 2

DATED : JANUARY 3, 1995

INVENTOR(S) : Yasuhiko KURATA, et al.

It is certified that error appears in the above-indentified patent and that said Letters Patent is hereby corrected as shown below:

Title page, and col. 1;

"APPARATUS HAVING PRIORITY ORDER STORAGES FOR RECOVERY FROM FAILURE OF MULTIPLEX DATA TRANSMISSION" should be --APPARATUS HAVING PRIORITY ORDER STORAGES FOR FAILURE RECOVERY FROM MULTIPLEX DATA TRANSMISSION--.

TITLE PAGE [57] ABSTRACT, line 6, "to priority" should be --to the priority--.

Col. 1,      line 3, "RECOVERY FROM FAILURE OF" should be --FAILURE RECOVERY FROM--;

Col. 4,      line 16, "identifies" should be --identifies,--;
line 44, "five" should be --(five--.

Col. 5,      line 13, "83" should be --S3--;
line 37, "821," should be --S21,--;
line 67, "overflows," should be --overflow,--.

UNITED STATES PATENT AND TRADEMARK OFFICE
CERTIFICATE OF CORRECTION

PATENT NO. : 5,379,292

DATED : JANUARY 3, 1995

INVENTOR(S) : Yasuhiko KURATA, et al.

It is certified that error appears in the above-indentified patent and that said Letters Patent is hereby corrected as shown below:

Col. 6,  line 2, "over, flows" should be --overflows--;
        line 29, "Generation" should be --generation--.

Col. 8,  line 31 (claim 6), "dam" should be --data--.

Signed and Sealed this

Fifteenth Day of August, 1995

Attest:

BRUCE LEHMAN

*Attesting Officer*    Commissioner of Patents and Trademarks